(12) United States Patent
Morss

(10) Patent No.: US 8,898,572 B2
(45) Date of Patent: *Nov. 25, 2014

(54) VIRTUAL WIRING

(71) Applicant: Catalina Computing, LLC, Concord, MA (US)

(72) Inventor: Stephen Williams Morss, Concord, MA (US)

(73) Assignee: Catalina Computing, LLC, Concord, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,807

(22) Filed: Nov. 6, 2013

(65) Prior Publication Data

US 2014/0059470 A1  Feb. 27, 2014

Related U.S. Application Data

(63) Continuation of application No. 12/235,904, filed on Sep. 23, 2008, now Pat. No. 8,601,376.

(51) Int. Cl.
G06F 3/048 (2013.01)
G06F 3/0481 (2013.01)
H04L 12/28 (2006.01)

(52) U.S. Cl.
CPC ............ G06F 3/04815 (2013.01); G06F 3/048 (2013.01); H04L 12/2818 (2013.01)
USPC .......................................... 715/746; 340/531

(58) Field of Classification Search
None
See application file for complete search history.

(56) References Cited

U.S. PATENT DOCUMENTS

| 6,167,432 | A | 12/2000 | Jiang |
| 6,393,297 | B1 | 5/2002 | Song |
| 6,484,061 | B2 | 11/2002 | Papadopoulos et al. |
| 7,161,483 | B2 * | 1/2007 | Chung .......................... 340/531 |
| 7,216,659 | B2 | 5/2007 | Caamano et al. |
| 7,337,078 | B2 | 2/2008 | Bond et al. |
| 7,363,031 | B1 | 4/2008 | Aisa |
| 7,373,661 | B2 | 5/2008 | Smith et al. |
| 8,601,376 | B2 | 12/2013 | Morss |
| 2009/0077624 | A1 | 3/2009 | Baum et al. |
| 2010/0077312 | A1 | 3/2010 | Morss |

FOREIGN PATENT DOCUMENTS

| CN | 1236603 | 6/2000 |
| KR | 10-0279717 | 2/2001 |
| KR | 10-2008-0019354 | 3/2008 |
| KR | 10-0820793 | 4/2008 |
| KR | 10-2008-0060482 | 7/2008 |
| WO | WO2010/039508 | 4/2010 |

OTHER PUBLICATIONS http://www.insteon.net/faq-home.html. "Frequently Asked Questions." Retrieved Feb. 9, 2009. SmartLabs Inc. 3 Pages.

(Continued)

Primary Examiner — Matt Kim
Assistant Examiner — Tuan S Nguyen
(74) Attorney, Agent, or Firm — Fish & Richardson P.C.

(57) ABSTRACT

Disclosed is a method and system for enabling a user, through a user interface, to manage a correspondence that defines how information about a state of a first device at a first location is to be used to control a second device at a second location.

30 Claims, 11 Drawing Sheets

(56) References Cited

OTHER PUBLICATIONS http://www.digi.com/pdf/faq_drop_in_networking.pdf. "FAQs: Drop-in Networking." Updated Jun. 12, 2007, Digi International Inc. Retrieved Feb. 9, 2009. 4 Pages.

http://www.homeheartbeat.com/HomeHeartBeat/Whatisit/index.htm. "What is Home HeartBeat?" Retrieved Feb. 9. 2009. Copyright Eaton Corporation 2009, 4 Pages.

Authorized officer Dae Shik Im, International Search Report and Written Opinion in PCT/US2009/057939 mailed May 10, 2010, 11 pages.

Authorized officer Athina Nickitas-Etienne, International Preliminary Report on Patentability in PCT/US2009/057939 mailed Apr. 7, 2011, 6 pages.

"An Internet Address for Every Light Bulb," [online] [Retrieved on May 24, 2011]; Retrieved from the Internet URL: http://www.nxp.com/news/content/file_1896.html.

Rowe et al., "Sensor Andrew: Large-Scale Campus-Wide Sensing and Actuation," CMU-ECE-TR-08-11, Carnegie Mellon University pp. 1-12 (2008).

"Z-Wave: The New Standard in Wireless Remote Control," [online] [Retrieved on Jun. 2, 2011]; Retrieved from the Internet URL: http://www.z-wave.com/modules/AboutZ-Wave/.

Wikipedia, "Verilog", retrieved from Internet on May 2, 2014, http://en.wikipedia.org/wiki/Verilog (18 pages).

Transaction History of U.S. Appl. No. 12/235,904, filed Sep. 23, 2008.

\* cited by examiner

| user is "smith" |
|---|
| Welcome |
| Connectors |
| Events |
| Wires |
| Logout |

Listing wires

| Start Connection | End Connection | | | |
|---|---|---|---|---|
| 3 switches (1) | 4 Relays (1) | Show | Edit | Destroy |

New wire

| user is "smith" |
|---|
| Welcome |
| Connectors |
| Events |
| Wires |
| Logout |

Listing connectors

| Owner | Name | Value | Current State | | | | | | |
|---|---|---|---|---|---|---|---|---|---|
| smith | 3 switches | [1, 2, 3] = on, on, on | | Show | Edit | Destroy | Users | Terminals (3) |
| smith | 4 relays | [1, 2] = on, on | on, on, off, on | Show | Edit | Destroy | Users | Terminals (4) |

New connector

VIRTUAL WIRING

CLAIM OF PRIORITY

This application is a continuation and claims priority under 35 U.S.C. §120 to U.S. patent application Ser. No. 12/235,904, filed Sep. 23, 2008, the entire content which is incorporated here by reference.

BACKGROUND

This description relates to virtual wiring.

SUMMARY

Disclosed are methods and systems for virtual wiring.

In one aspect, a method includes, through a user interface, enabling a user to manage a correspondence that defines how information about a state of a first device at a first location is to be used to control a second device at a second location.

The following are examples within the scope of this aspect.

The correspondence defines a virtual connection of the first device and the second device. The virtual connection carries the information about the state of the first device to the second device.

The state of the first device is changing no faster than about once a second. The state of the first device comprises on or off. The state of the first device comprises a level within a range.

The user interface is based on a wiring analogy in which the correspondence is analogized as a wire that conducts the information about the state of the first device at the first location to the second device at the second location. The information about the state of the first device is received from a state sensor that is associated with the first device and is used at the second location by a controller that is associated with the second device.

The user interface enables the user to define and manage virtual connections to carry state information from one or more of an arbitrary number of source devices to one or more of an arbitrary number of controlled devices. The user interface enables the user to define a set of virtual connections of arbitrary size and complexity.

The method includes, through the user interface, enabling the user to define and manage the information about the state of the first device. The method includes enabling the user to specify one or more predetermined events, and sending alerts in response to occurrences of the one or more predetermined events.

The user interface is configured to provide information regarding the correspondence to an application capable of managing the information. The user interface is a web-based user interface.

In another aspect, a system includes a user interface to manage a correspondence that defines how information about a state of a first device at a first location is to be used to control a second device at a second location.

The following are examples within the scope of this aspect.

In the system, the correspondence defines a virtual connection of the first device and the second device. The user interface is based on a wiring analogy in which the correspondence is analogized as a wire that conducts the information about the state of the first device at the first location to the second device at the second location. In the system, the information about the state of the first device is received from a state sensor that is associated with the first device and is used at the second location by a controller that is associated with the second device.

The user interface enables the user to define and manage virtual connections to carry state information from one or more of an arbitrary number of source devices to one or more of an arbitrary number of controlled devices. The user interface enables the user to define a set of virtual connections of arbitrary size and complexity. The user interface enables the user to define and manage the information about the state of the first device. The user interface is a web-based user interface.

In another aspect, a computer-readable medium includes instructions to, through a user interface, enable a user to manage a correspondence that defines how information about a state of a first device at a first location is to be used to control a second device at a second location.

The following are examples within the scope of this aspect.

The correspondence defines a virtual connection of the first device and the second device. The virtual connection carries the information about the state of the first device to the second device. The state of the first device is changing no faster than about once a second. The state of the first device comprises on or off. The state of the first device comprises a level within a range.

The user interface is based on a wiring analogy in which the correspondence is analogized as a wire that conducts the information about the state of the first device at the first location to the second device at the second location. The information about the state of the first device is received from a state sensor that is associated with the first device and is used at the second location by a controller that is associated with the second device. The user interface enables the user to define and manage virtual connections to carry state information from one or more of an arbitrary number of source devices to one or more of an arbitrary number of controlled devices.

The user interface enables the user to define a set of virtual connections of arbitrary size and complexity. The medium includes instructions to, through the user interface, enable the user to define and manage the information about the state of the first device. The medium includes instructions to enable the user to specify one or more predetermined events, and sending alerts in response to occurrences of the one or more predetermined events.

The user interface is configured to provide information regarding the correspondence to an application capable of managing the information. The user interface is a web-based user interface.

Other aspects and features and combinations of them can be expressed as methods, apparatus, systems, program products, means for performing functions, and in other ways.

Some advantages include the following. The devices are "wired" together using simple wiring commands from a graphical user interface. No network modifications are needed at wiring sites, as long as they have basic network connectivity. The devices connect to standard wires and connectors, so no additional investment in electrical equipment is required at the sites. Additional cost savings can be achieved by integrating the state sensor and controller into the devices.

Other advantages and features will become apparent from the following description and claims.

DESCRIPTION

FIGS. 5-16 are screen shots of an example graphic user interface.

Figure 1:
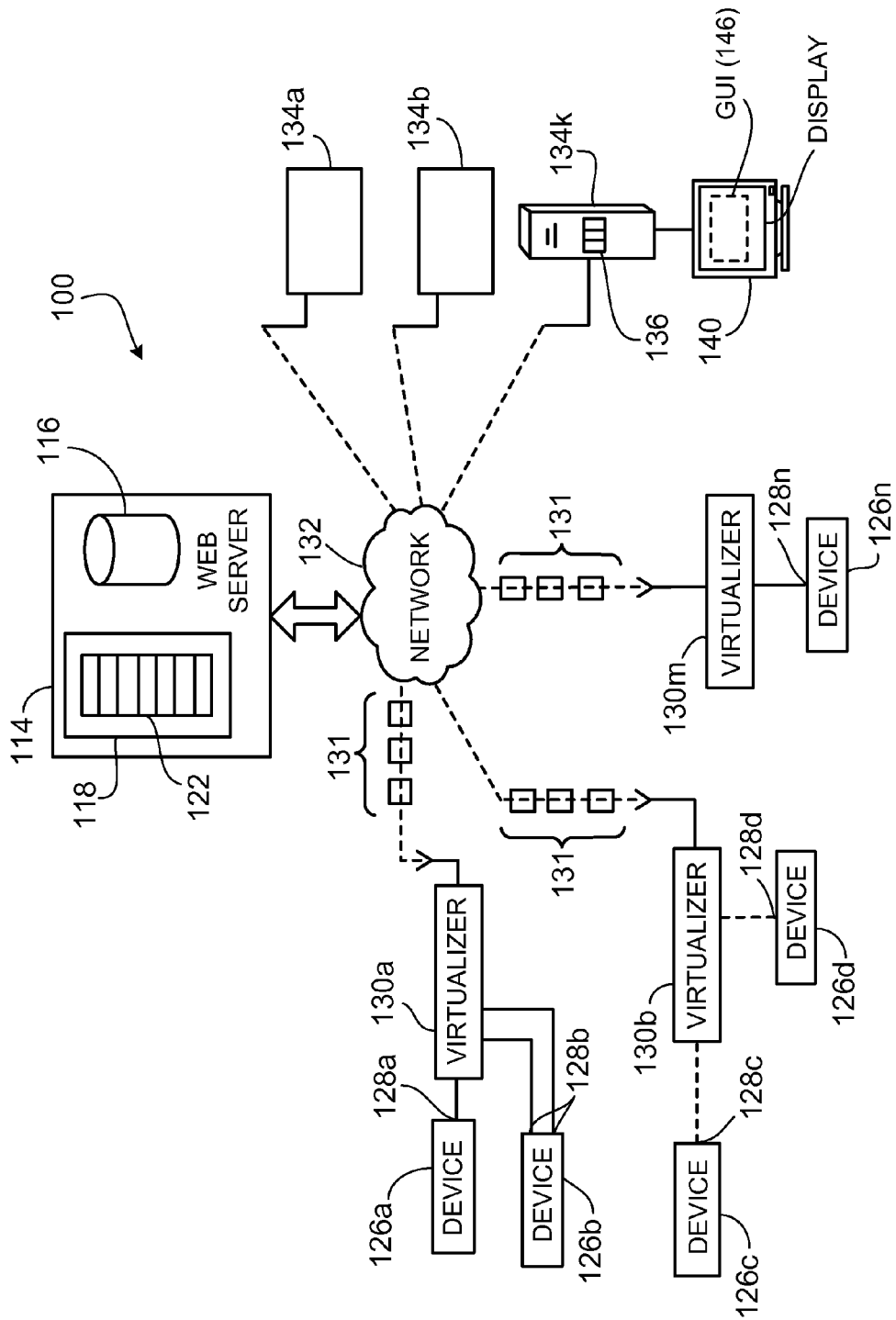
FIG. 1 is a block diagram of a virtual wiring system.

Referring now to FIG. 1, a virtual wiring system 100 includes a server 114 having a computer memory or storage media 118 storing a server process 122, and devices 126a-n (generally 126) that are connected to virtualizers 130a-m (generally 130). The system 100 provides for traditional wired or wireless connections between the devices 126a-n to be replaced with virtual "wires," i.e., virtual connections, that run over a network 132. The virtual wires carry state information that includes, for example, information about a state or changes in a state of a source device 126, over the network 132 to a device to be controlled based on the information. For example, in some implementations, a virtual wire can carry information about a state of a first device 126a, e.g., a switch or a controller that is connected to a first virtualizer 130a, over the network 132 to a second device 126n, e.g., a relay or a controlled device that is connected to a second virtualizer 130m. The network 132 can be any local or wide area network, or an arrangement such as the Internet.

The system 100 provides a framework for the virtual wires to be connected, monitored, logged, and rewired through the server 114. For example, the server process 122 in the server 114 includes software methods for monitoring and managing virtual connections between the devices 126. In some examples, the server 114 can include a database 116 having information regarding, for example, virtual connections between the devices 126a-n, current states of the connections, and a log of past connections. In some examples, the server 114 also has the ability to send alerts regarding predetermined activity through e-mail, text message, or other messaging service.

In some examples, the server 114 and can run on small laptops or large server farms. In some examples, the server 114 is implemented as a Web server using Internet protocols. The optional database 116 may reside on the same server 114 as the server process 122 or may reside on another server that is either local or remote to the server 114.

In some implementations, the server 114 can be multi-user, i.e., many virtual wiring plans can be set up to run simultaneously and independent of each other. In such implementations, users can log on to the server 114 through client terminals 134a-k (generally 134). Multi-user ability allows the server 114 and devices 126 to be shared amongst many users. One advantage to multi-user server implementations is reduced cost of setting up an Internet wiring circuit, since the higher cost of a server 114 is shared among many users.

The devices 126 can include electric or electronic devices to which connections can be made through ports 128a-n (generally 128) of the devices 126. The devices 126 can be wired or wireless devices. For example, the devices 126 can include switches, relays, circuit breakers, LEDs, LCDs, sensors (e.g., for light, humidity, temperature), gauges, controls, computer equipment (e.g., monitors, routers, controllers), and other devices.

In some examples, the states of the devices 126 change at a substantially low rate. Accordingly, in some examples, the virtual wiring system 100 does not require high speed network connections. For example, in some implementations, the states of the devices 126 are changing no faster than about once a second. In such implementations, for example, the state of a switch device 126 does not change from "ON" to "OFF" more than about once in a second. Consequently, data rate throughput levels in the network 132 may remain substantially unaffected.

The virtualizers 130 terminate traditional wired or wireless connections associated with one or more devices 126 and transmit state information about the one or more devices 126 to the server 114 through the network 132. The devices 126 can connect to the virtualizers 130 through their ports 128 using, for example, wired connections (e.g., connections with ports 128a-b), or wireless connections (e.g., connections with ports 128c-d).

In some examples, virtualizers 130 can be state sensors or controllers. Virtualizers 130 that are state sensors monitor the devices 126 they are connected with and transmit state information regarding the devices 126 to the server 114. Virtualizers 130 that are controllers are capable of, in addition to monitoring the devices 126, effecting state changes in the devices 126. In some examples, the virtualizers 130 can include a first set of ports for sensing and transmitting information regarding the states of devices 126 connected to the first set of ports, and a second set of ports for sensing, transmitting and affecting the states of devices 126 connected to the second set of ports.

For example, a virtualizer 130a can be a state sensor configured to detect a change in the state of a switch circuit in a first location, and convey this state information to another location over the network 132. At the other location, another virtualizer 130b can be a controller configured to use the state information to effect a change in the state of, for example, a relay.

In some examples, the state information is sent and received over the network 132 using standard Internet Protocol messages. For example, the virtualizers 130 can communicate with the server 114 through Web messages 131, e.g., messages sent using the Hypertext Transfer Protocol (HTTP) or the Hypertext Transfer Protocol over Secure Socket Layer (HTTPS). One advantage of Web messaging is that because firewalls are typically set up to allow Web traffic, Web messages 131 from the virtualizer 130 can pass through the firewalls without firewall configuration changes. This can reduce installation costs and time, as well as permit users who lack network expertise to use the virtual wiring system 100.

The virtual wiring system 100 include client terminals 134 that are connected to the server 114 through the network 132. A client terminal, e.g., terminal 134k, typically includes a processor running a client process 136 and a display 140. In some examples, the display 140 provides information to a user in the form of a user interface 146 that can be a graphic or text-based user interface. In some examples, the user interface 146 is a web-based user interface 146 that communicates with the server 114 using a standard Web protocol. Users of the system 100 can connect to the server 114 by logging on through the interface 146 at the client terminal 134.

As described in detail below, through the user interface 146, users can define, e.g., create, and manage, e.g., modify, delete, or reconfigure, one or more correspondences that define how virtual connections carrying state information about a device at one location is to be used to control another device at another location. For example, the state information about a device at one location can be used to effect state changes in the device at the other location.

In some examples, users can also define and manage the state information carried by a virtual connection through the graphical user interface 146. For example, a user can change the state information associated with, for example, a light switch, by merely setting the state of the switch from "ON" to "OFF" through the graphical user interface 146.

In some examples, an application programming interface can be used to develop applications that interact with the system 100, and is configured to set up virtual connections, read state information carried by the connections, and effect changes to the virtual connections or the state information. For example, a Representational State Transfer (REST) based application programming interface (API) can be employed to create applications for monitoring, using or changing virtual connections or state information in the system 100. Accordingly, a user can create a web application on their website for defining a set of buttons, alerts, and trigger thresholds based on information from the system 100. For example, the application can be set up to monitor the state of a temperature terminal, and depending on user defined values such as, for example, time of day, season, and weather, the application can send a text message or e-mail to a specified address. In some examples, these applications can be embedded applications included in a device.

Figure 2:
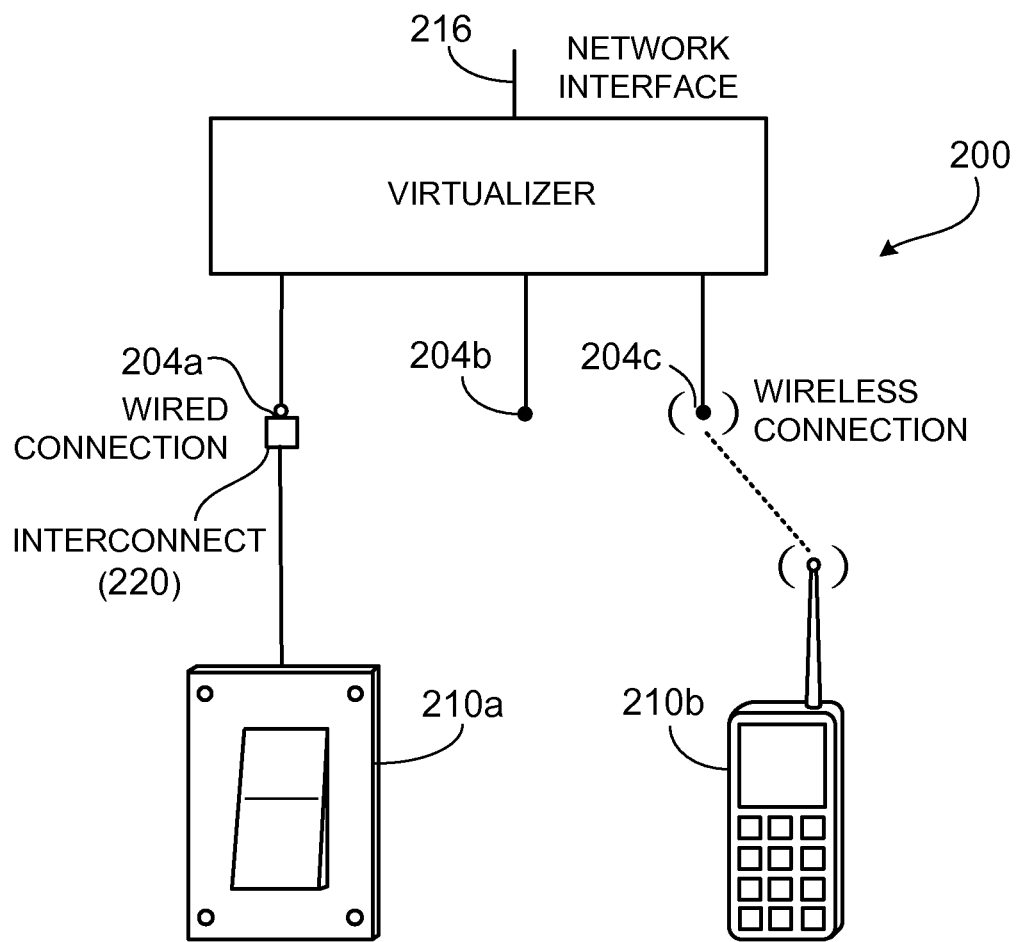
FIG. 2 is a block diagram of a virtualizer.

FIG. 2 is a block diagram of an example virtualizer 200. The virtualizer 200 includes hardware and software components for monitoring and controlling devices 210*a-b* (generally 210) and communicating state information regarding the devices 210 with the server 114. In some examples, the virtualizer 200 is a router, a personal computer, or an embedded device. For example, the virtualizer 200 can be a Linux, Mac, or Windows based computer running software for monitoring and controlling the devices 210*a-b* based in part on messages received from the server 114. The virtualizer 200 can include one or more wired ports, e.g., ports 204*a-b* and one or more wireless ports, e.g., port 204*c*. For example, the virtualizer 200 can include a universal serial bus ("USB") port, an RS232 connector, or a Bluetooth port.

A device 210*a* with which a connection can be made through a port, e.g., a switch, can be connected to a wired port, e.g., port 204*a* of the virtualizer 200. A wireless device, e.g., a remote controller, can be wirelessly connected to a wireless port, e.g. port 204*c* of the virtualizer 200.

An interconnect 220 provides a connector for connecting devices 210 to the system 100 through the ports 204*a-c* of the virtualizer 200. A variety of interconnects 220 can be employed to support different types of devices 210.

For example, a 4 relay switch block interconnect is provided to allow up to 4 separate relays for independent switching of 4 sets of inputs. In some examples, an 8 digital input/output and analog input interconnect is provided for 8 separate connections for control and monitoring of up to 8 digital inputs/outputs or 8 analog inputs.

In some examples, a 3 digital input/output and analog input interconnect is provided for 3 separate connections for control and monitoring of up to 3 digital circuits or 3 analog inputs. In some examples, an interconnect can be provided to connect to a proprietary network or devices belonging to third-party vendors. For example, a MaxSteam/Digi ZigBee interconnect can be provided to interface to a network based on the MaxStream/Digi ZigBee standard provided by Digi International, Minnetonka, Minn. An INSTEON/X10 interconnect is provided to interface with devices implementing the X10 and INSTEON protocol provided by Smart Labs, Irvine, Calif.

In some examples, a universal interconnect 220 that is capable of supporting multiple types of devices 210 can be employed.

In operation, the virtualizer 200 polls the local devices, i.e., devices 210*a-b* connected to the ports 204*a-c*, for state information, e.g., information regarding changes in states of the devices 210*a-b*. For example, a state change occurs when the switch 210*a* changes its state from "ON" to "OFF." Accordingly, when the virtualizer 200 polls the switch 210*a*, it senses the state change of the switch 210*a* as state information regarding the switch 210*a*. The virtualizer 200 then transmits this state information through a network interface 216 to the server 114.

In some examples, the virtualizer 200 also polls the server 114 for state information, e.g., state changes in virtual connections with the devices 210*a-b*. Based on the information received from the server 114, the virtualizer 200 updates states of the local connections with the devices 210-*a-b*, or states of the devices 210*a-b*.

In some examples, the server 114 can generate and transmit Web messages 131 to the virtualizer 200 substantially immediately in response to an event or state change detected at the server 114. Based on the Web messages 131, the virtualizer 200 can immediately change the state of a locally connected device 210 without having to wait for polling to complete. Accordingly, the response time of the virtualizer 200 can be improved. For example, in some implementations, the system 100 can be implemented using extensible messaging and presence protocol (XMPP) standard, in which virtualizers 200 can wait for the server 114 to send state information updates to the virtualizers 200. Based on the state information updates, the virtualizers 200 can change states of the local devices 210.

Figure 3:
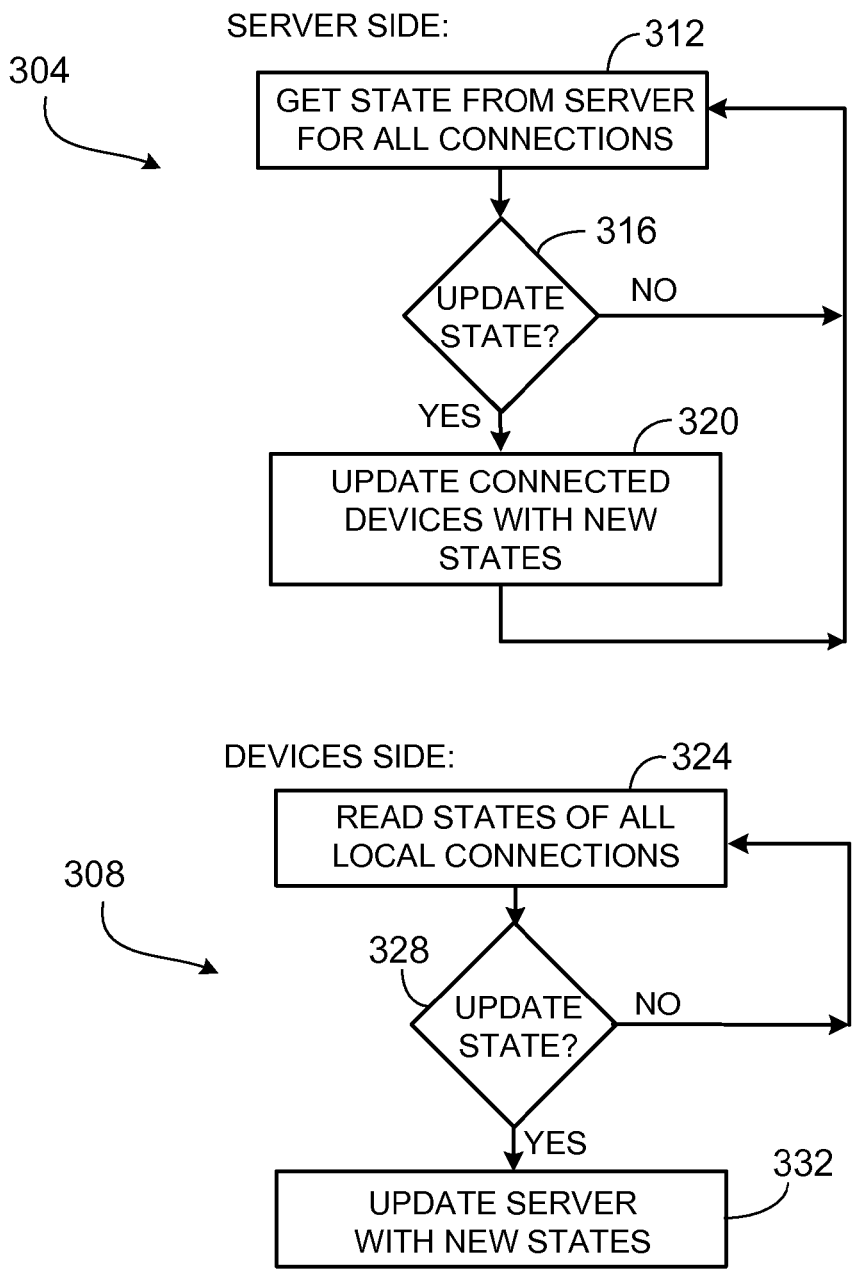
FIG. 3 is a flowchart of the virtualizer process.

FIG. 3 shows an example virtualizer process using an example polling mechanism. As shown, the virtualizer process includes a server-side process 304 and a devices-side process 308.

Referring to the server side process 304, in some examples, the virtualizer 200 periodically polls the sever 114 for state information, e.g., information regarding changes in states of the devices 210 or virtual connections between the devices 210. The virtualizer 200 receives state information from the server 114 for all local connections to the devices 210. (step 312) The virtualizer 200 reviews the state information for state changes. (step 316) If a state change for any of the local connections to the devices 210 is detected, the virtualizer 200 updates states of local connections with the devices 210, or states of the devices 210 that are connected to the virtualizer 200. (step 320) For example, if the virtualizer 200 is connected to a relay, and the state information received from the server 200 regarding the connection with the relay indicates that the relay's state has changed from "OFF" to "ON," then the virtualizer 200 updates the state of the relay from "OFF" to "ON," in accordance with the state information. If no state change is detected, the virtualizer 200 returns to continue polling the server 114.

Referring to the devices-side process 308, the virtualizer 200 periodically polls the devices 210 connected to the virtualizer 200 for state changes in local connections with the devices 210.

The virtualizer 200 reviews the state of all local connections with the devices 210. (step 324). In some examples, the virtualizer 200 determines whether any of the devices 210 have changed state. (step 328). If a state change is detected, the virtualizer 200 updates the server 114 with the state changes. (step 332). For example, if the state of the switch 210*a* has changed from "OFF" to "ON," the virtualizer 200 updates the server 114 with the new state. If no state change is detected, the virtualizer 200 returns to continue polling the devices 210.

In some examples, the virtualizer 200 generates and transmits Web messages 131 periodically regardless of whether there are any state changes. The server 114 reviews the periodic Web messages 131 for state changes, and updates the virtual connections based on the state changes.

In some examples, the virtualizer 200 must be authenticated before it can access the server 114 to poll for state changes and receive state information. The virtualizer 200 can be authenticated using any authentication protocol known to persons skilled in the art. For example, each virtualizer 200 in the system 100 can be assigned virtualizer or user credentials, e.g., a unique identifier and password. At the server 114, information regarding authorized or valid virtualizers 200 can be maintained in an authorized virtualizers database (not shown). Invalid virtualizers 200 can include virtualizers that are improperly configured, or virtualizers that use an incorrect communication protocol to connect to the server 114.

Figure 4:
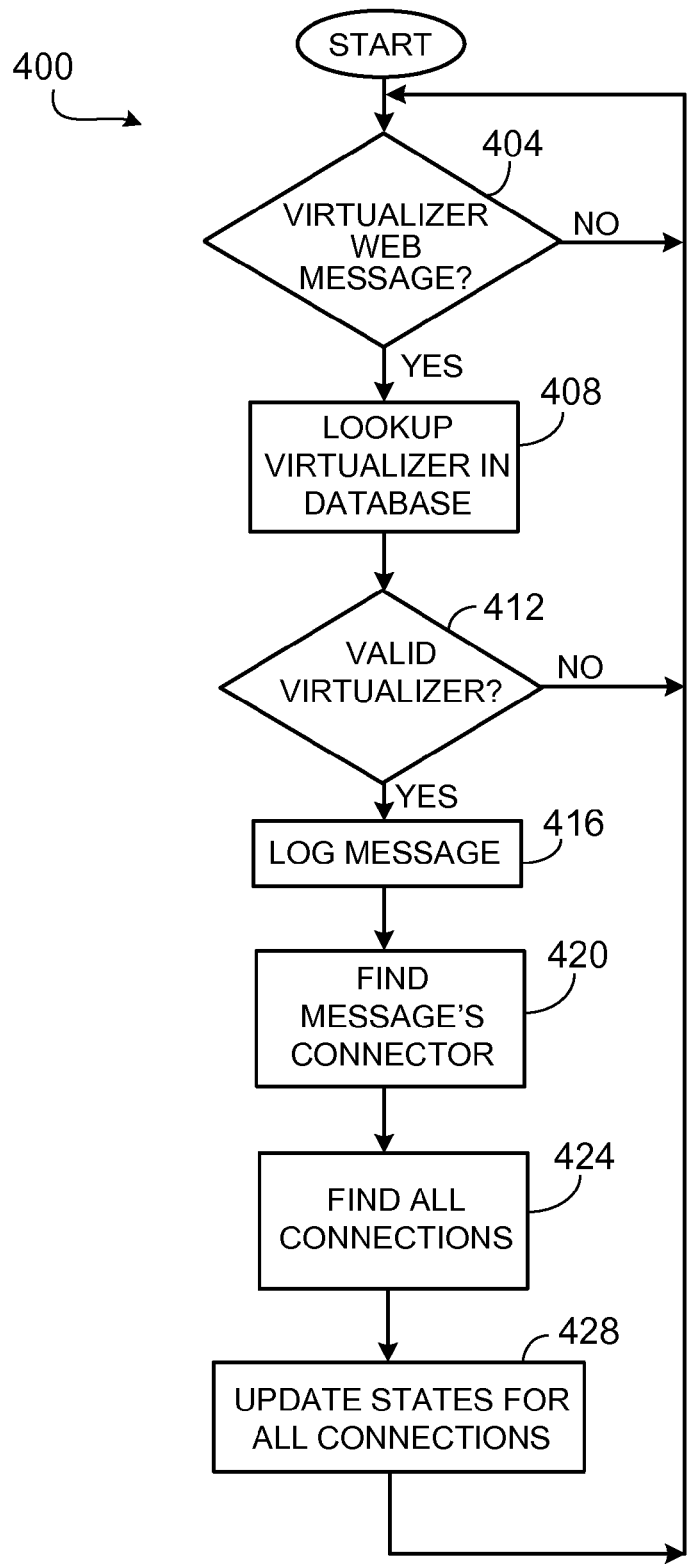
FIG. 4 is a flowchart of the server process.
Figure 5:
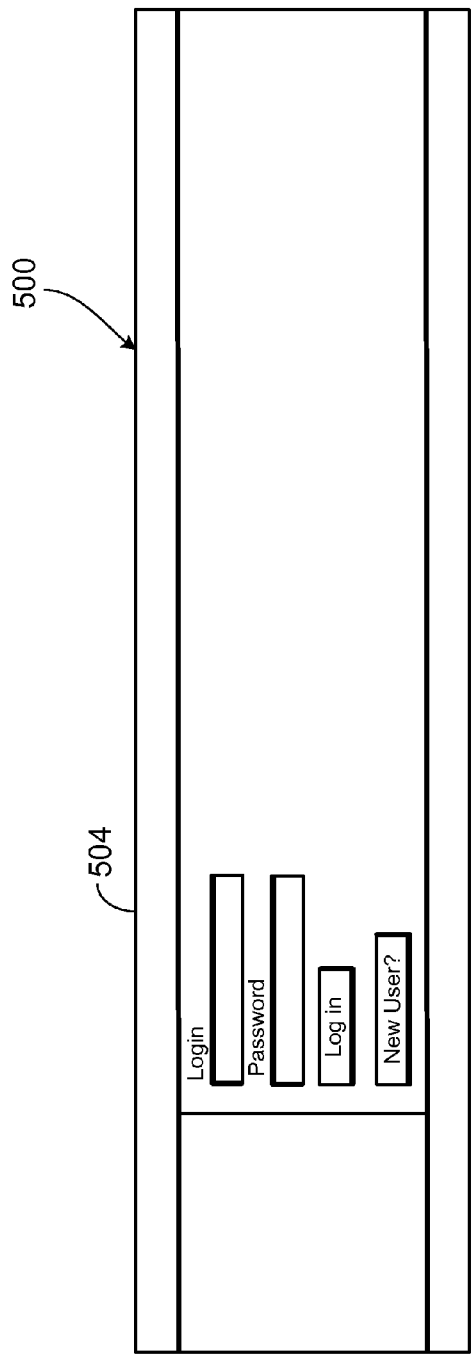
Figure 6:
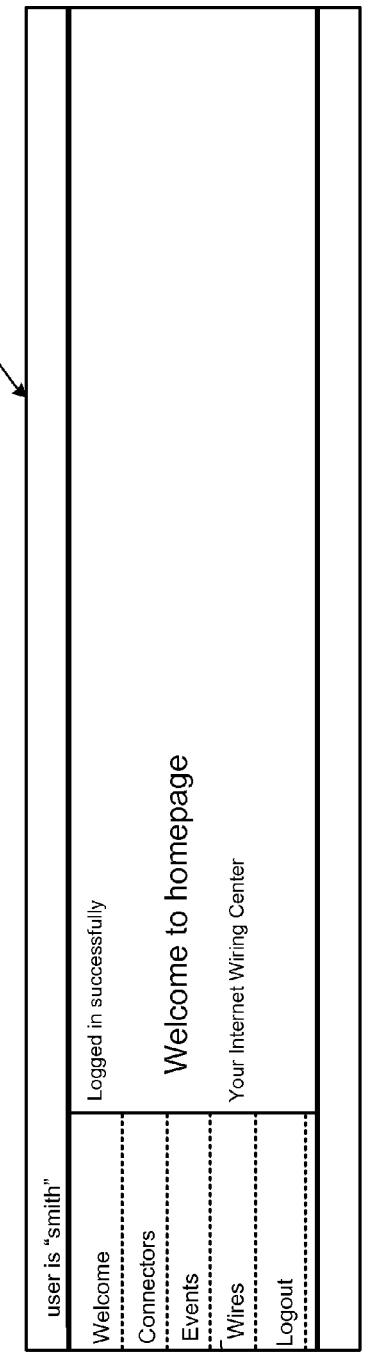

FIG. 4 shows an example server process to handle a Web message 131 from a virtualizer attempting to connect to the server 114 over the network 132. The server 114 receives a Web message 131 from the virtualizer 200. (step 404). In some examples, the virtualizer 200 attempting to access the server 114 transmits virtualizer credentials along with state information regarding the devices 210.

In some examples, the virtualizer 200 transmits virtualizer credentials in a first Web message 131. Once the virtualizer 200 has been authenticated, the virtualizer 200 can begin to transmit state information regarding a device 210 in subsequent Web messages 131 to the server 114.

The server 114 uses the virtualizer credentials in the Web message 131 to look up the virtualizer 200 in the authorized virtualizers database. (step 408). The server 114 determines whether the virtualizer 200 is a valid virtualizer 200 or a virtualizer 200 that is authorized to connect to the server 114. (step 412)

In some examples, the Web message 131 from the virtualizer 200 is logged when the virtualizer 200 is deemed a valid virtualizer 200 or the virtualizer 200 is authorized to connect to the server 114. (step 416) In some examples, the Web message 131 from the virtualizer 200 is logged regardless whether the virtualizer 200 is deemed a valid virtualizer 200 or whether the virtualizer 200 is authorized to connect to the server 114. One advantage of logging all Web messages 131 regardless of whether a virtualizer 200 is a valid virtualizer 200 or an authorized virtualizer 200 is to troubleshoot for unauthorized access or attempts to access the system 100.

If the Web message 131 includes state information, the Web message 131 is reviewed to determine the connector associated with the Web message 131, i.e., the device 210 that is referenced in the state information. (step 416). The server 114 then identifies all virtual connections associated with the device 210. (step 420). For example, if the state information includes information regarding a change in the state of the switch 210a, the server identifies all devices 210 that are connected with or controlled by the switch 210a. The server 114 then updates the states of all virtual connections on the server 114. (step 424).

FIGS. 5-16 show screen shots of an example graphical user interface 500. The interface 500 is a web-based interface displayed on a client terminal 134 (FIG. 1). The client terminal 134 can remotely connect to the server 114 over the network 132, which can be, for example, the Internet. In some examples, the interface 500 is a Web-based management interface displayed on a terminal connected to the server 114.

In some examples, in a multi-user environment, multiple accounts can be created to run different virtual wiring plans simultaneously and independent of each other. In such an implementation, a user can log on to the server 114 through the page 504 shown in FIG. 5. Any standard Internet browser (e.g., Mozilla Firefox or Microsoft Internet Explorer) can be used to retrieve the page 504 by entering the server's uniform resource locator (URL) in an address bar of the browser. The method of accessing the server is not restricted. For example, one of ordinary skill will readily appreciate that page 504 could be retrieved from the server with various Internet-compatible devices such as a mobile phone, laptop computer, or desktop computer.

FIG. 6A shows an example "home" page 600 that lists various user options 604. The user options 604 include a listing of, for example, connectors, events, and wires. A user can also select the logout option to terminate a current session with the server 114.

Figure 7:
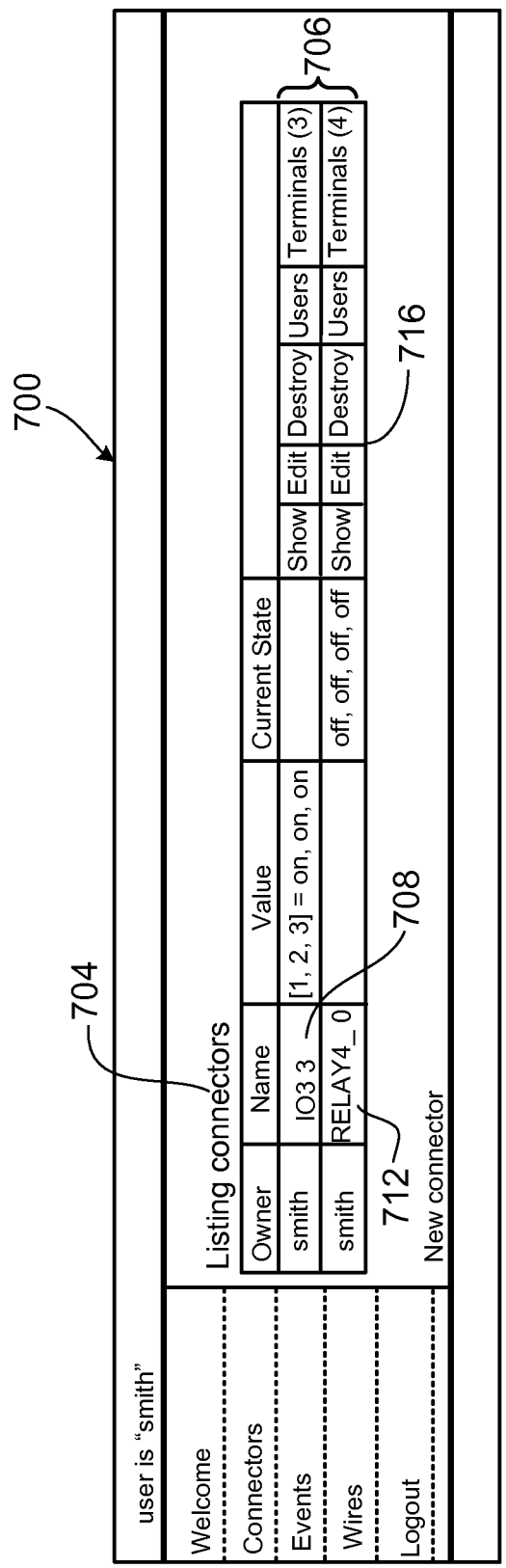

On clicking the tab "Connectors," the user is led to a page, e.g., page 700 in FIG. 7, showing a list 704 of connectors 706. As described above, a connector 706 is created for each interconnect 220 detected by a virtualizer 200. In some examples, a connector 706 is typically mapped to a device 210.

In some examples, the virtualizer 200 automatically creates a new entry in the list 704 for the connector 706 associated with an interconnect 220. For example, as shown in FIG. 7, virtualizers 200 that are connected to a block of switches 708 and a block of relays 712, respectively, have automatically created entries in the list 704.

The list 704 includes a column "Owner" for specifying a user friendly name for an entity that has ownership rights over the connectors 706. Similarly, a user friendly name for the connectors 706 can be specified in the column, "Name."

The column "Value" displays a value associated with terminals of an input connector, i.e, an input device. For example, for the block of switches 708 the "Value" column indicates a state of each of three switches ("[1, 2, 3]=on, on, on") in the block of switches 704. In general, the values expected on each output terminal of the connector 706 are a function of the kind of connector 706 associated with the interconnect 220 or device 210 connected to the interconnect 220.

In some examples, different types of values can be provided for the connectors 706. For example, a specialized light bulb connector can have "ON" or "OFF" values and also a brightness value. A thermostat connector, for example, can have a temperature reading.

The column "Current State" displays a current state of the terminals of an output connector, i.e., an output device or a device to be controlled. For an output device, e.g., the block of relays 712, the "Current State" column indicates a current state of each of four terminals ("off, off, off, off") of the block of relays 712.

In some examples, a final column provides a user with additional options 716 to monitor and manage each connector 706 in the list 704. For example, a user can view information, edit, or delete a connector 706 by clicking on "Show," "Edit," or "Destroy," respectively. In some examples, a user can also view a listing of all users of a connector 706 by clicking on the "Users" option.

In some examples, information regarding a number of terminals corresponding to each connector 706 can be displayed. For example, the page 700 displays that the block of switches 708 has three terminals, and the block of relays 712 has four terminals.

Figure 8:
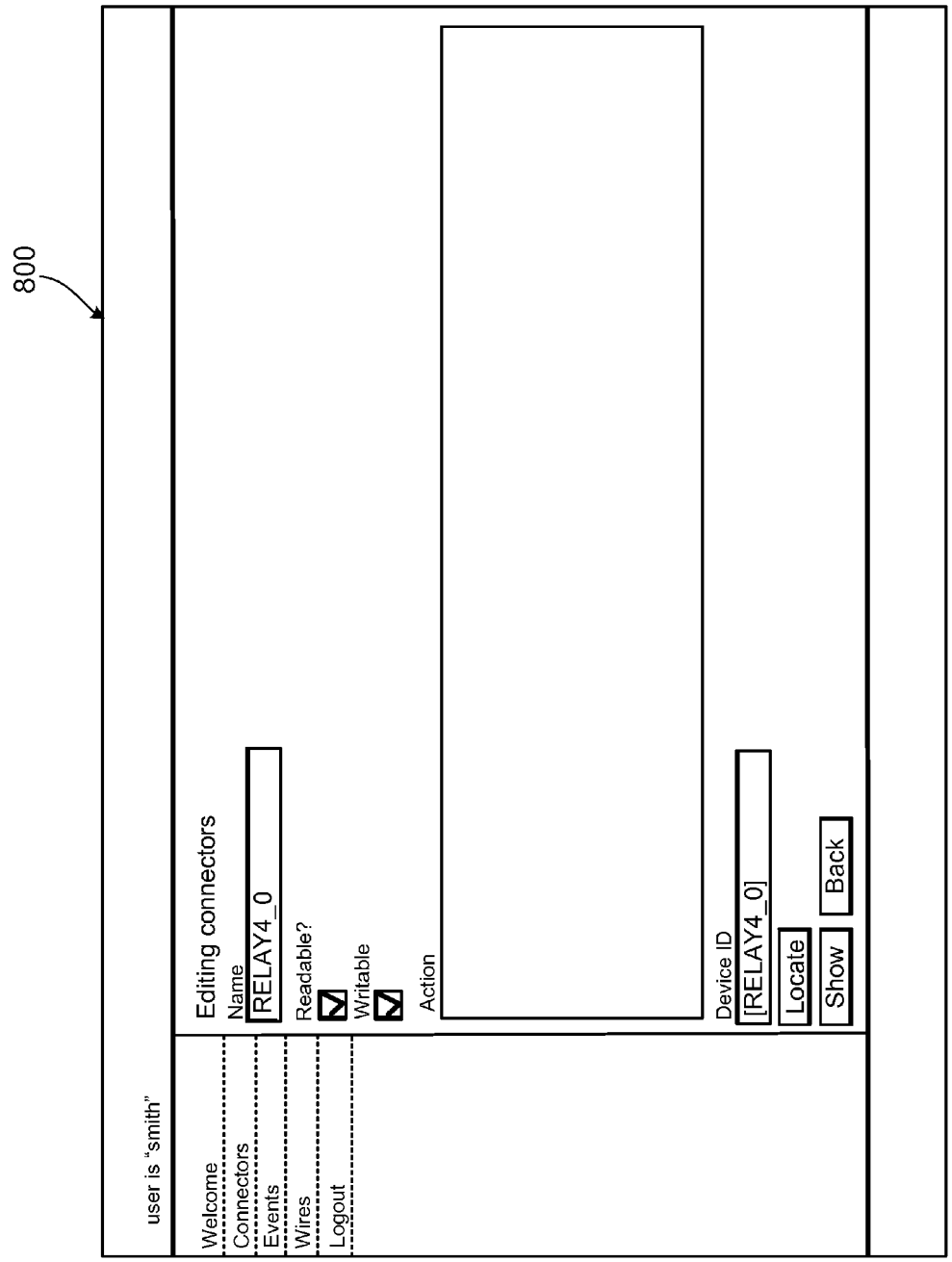
Figure 9:
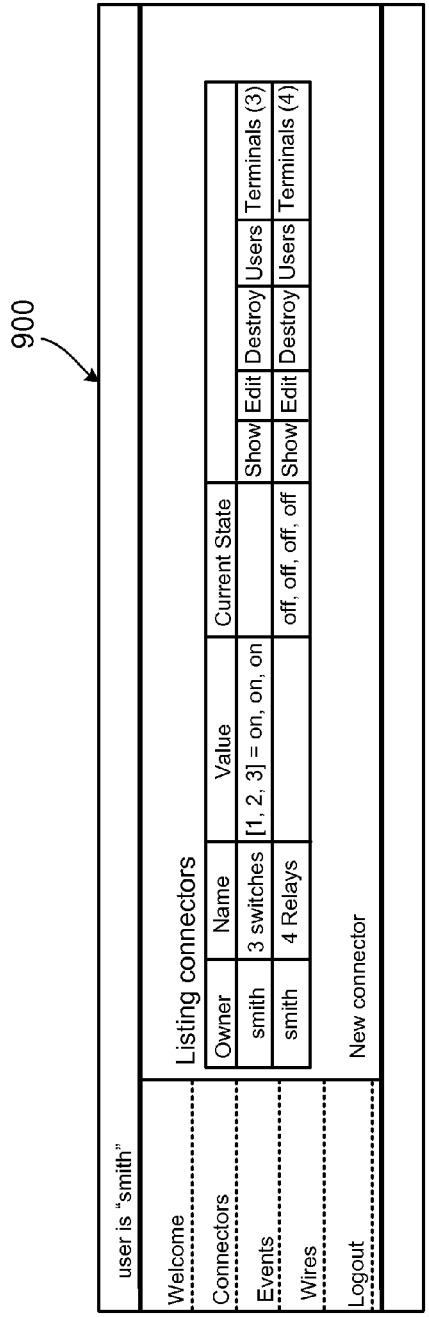

On clicking the "Edit" option, a user can proceed to change information regarding a connector through an "Editing connector" page, e.g., page 800 of FIG. 8. For example, a user can rename the block of relays 708 as "3 relays" and the block of switches 712 as "3 switches." FIG. 9 is a screen shot showing the list 704 of connectors having the "Name" column updated for each of the connectors 706.

Figure 10:
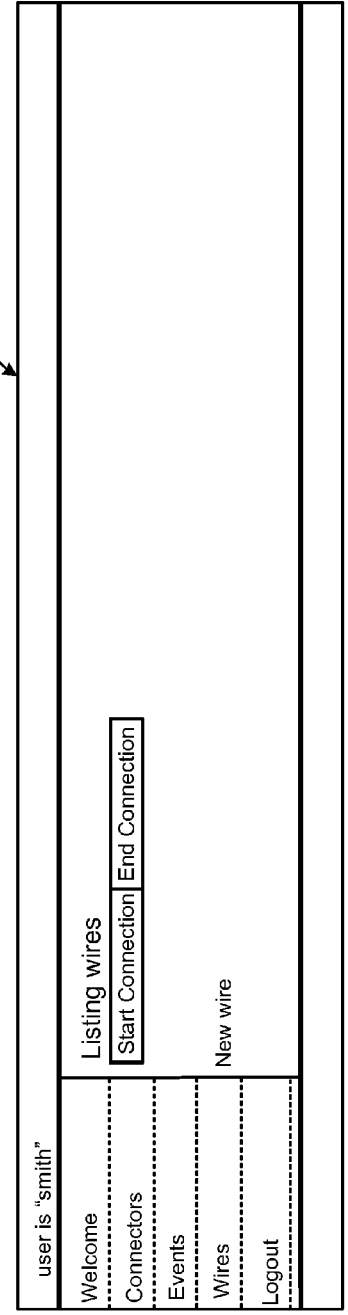

FIG. 10 shows a screen shot of an example page 1000 listing virtual wires running between the connectors 706. A user can click on "New wire" to create a new virtual wire between the connectors 706.

Figure 11:
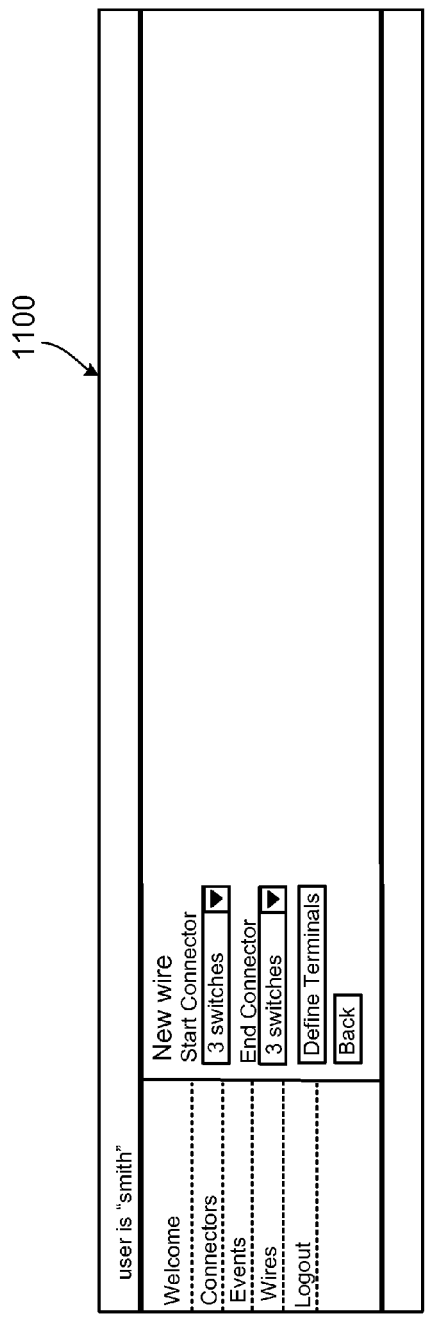
Figure 12:
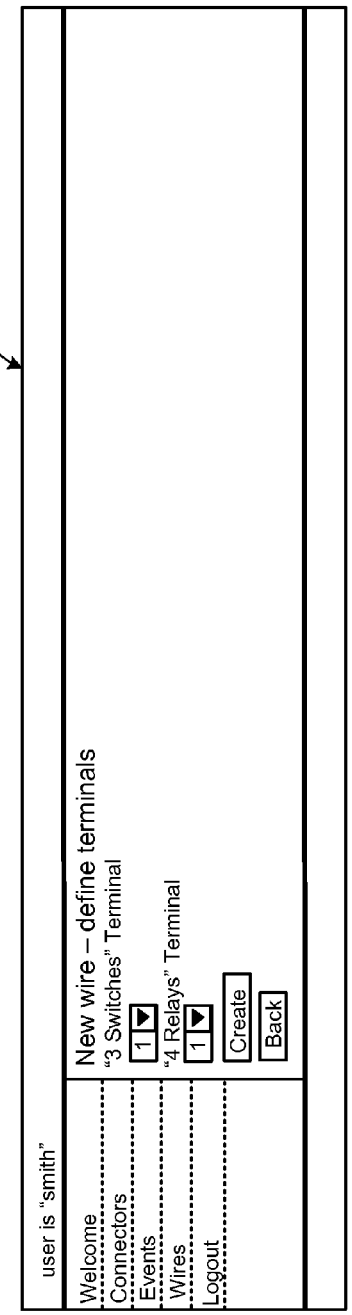

Referring now to FIGS. 11 and 12, in some examples, a user can create a new virtual wire by identifying a "start connector" and an "end connector," and specifying the terminals of the connector between which a new virtual wire is drawn. In the screen shots of example pages 1100 and 1200, the starting point of the new virtual wire is a terminal of the start connector, i.e., a terminal of the block of switches 708, and a terminal of the end connector, i.e., a terminal of the block of relays 712.

FIGS. 13 and 14 show screen shots of example pages 1300 and 1400 displaying an updated list of wires and list of connectors following the creation of the new virtual wire.

Figure 15:
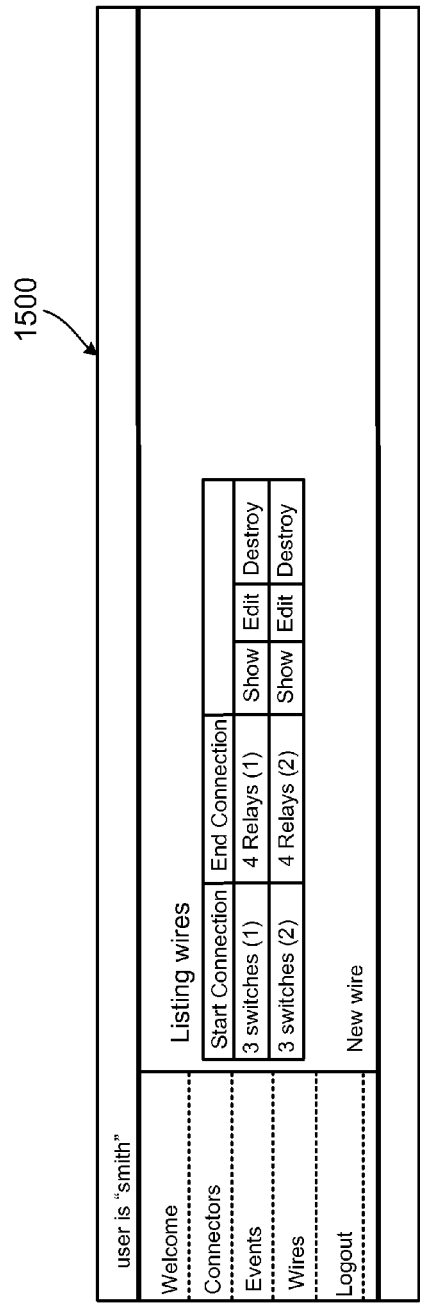
Figure 16:
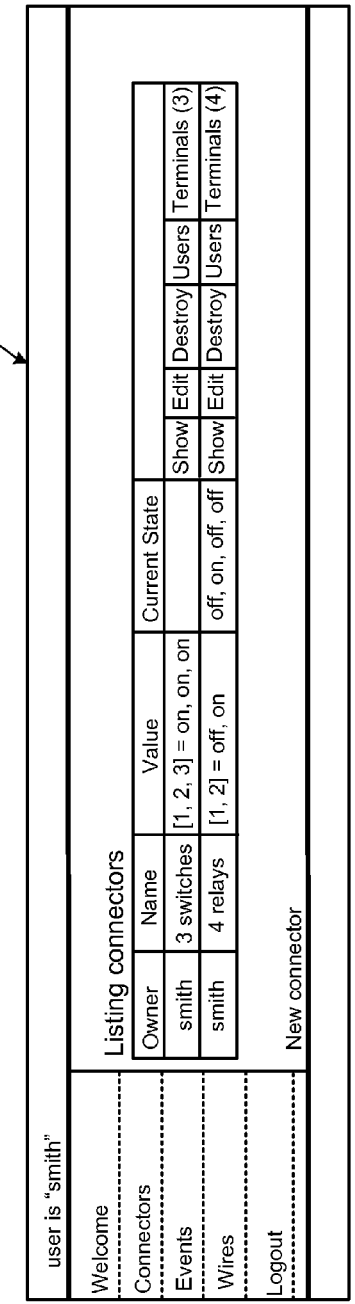

FIGS. 15-16 are screen shots showing example testing of the new virtual wire between the connectors. As shown, a first switch of the block of switches 708 is connected to a first relay of the block of relays 712. If the first switch of the block of switches changes state from "ON" to "OFF," the value on the first terminal of the block of switches 708 changes to "off" as shown in the screen shot of page 1600. Also, in response to the first switch being turned off, the first relay of the block of relays 712 changes state from "ON" to "OFF."

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Other embodiments are within the scope of the following claims and other claims to which the applicant may be entitled. The following are examples for illustration only and do not limit the alternatives in any way. The techniques described herein can be performed in a different order and still achieve desirable results Other implementations are within the scope of the following claims and other claims to which the applicant may be entitled.

What is claimed is:

1. A method comprising:
through a user interface, enabling a user to specify or change information that is stored at a virtual connection server and that specifies a virtual connection and a first end and a second end associated with the virtual connection,
the virtual connection being effected by making available at the second end an updated state of a first device that is associated with the first end and is received at the virtual connection server,
the updated state at the second end being made available from the virtual connection server for use in controlling a second device associated with the second end.

2. The method of claim 1 in which the updated state of the first device is changing no faster than at a predetermined rate.

3. The method of claim 2 in which the predetermined rate comprises once a second.

4. The method of claim 1 in which the updated state of the first device comprises a value.

5. The method of claim 4 in which the updated state of the first device comprises an on value or an off value.

6. The method of claim 1 in which the updated state of the first device is associated with an action.

7. The method of claim 6 in which the action comprises a switching of a state of the first device.

8. The method of claim 7 in which the action comprises a switching of the state between an on state and an off state.

9. The method of claim 1 in which the updated state of the first device comprises a level within a range.

10. The method of claim 1 in which the updated state of the first device is received from a state sensor that is associated with the first device and is used at the second end by a controller that is associated with the second device.

11. The method of claim 1 in which the user interface enables the user to specify or change information that is stored at a virtual connection server and that specifies virtual connections to effect updating states at second ends of the virtual connections based on updated states of an arbitrary number of such first devices for use in controlling one or more of an arbitrary number of such second devices.

12. The method of claim 1 comprising enabling the user to specify one or more predetermined events, and sending alerts in response to occurrences of the one or more predetermined events.

13. The method of claim 1 in which the user interface comprises a web-based user interface.

14. The method of claim 1 comprising
authenticating a virtualizer at the first end or the second end of the virtual connection as a condition to permitting the virtualizer to have access to or to change the information stored at the virtual connection server.

15. The method of claim 1 comprising enabling a device associated with the first end or the second end of the virtual connection to specify or change information that is stored at a virtual connection server and that relates to a virtual connection.

16. The method of claim 1 comprising
enabling the user to specify or change information that is stored at the virtual connection server and that specifies multiple virtual connections and a first end and a second end associated with each of the virtual connections.

17. The method of claim 1 comprising
enabling multiple users each to specify or change information that is stored at the virtual connection server and that specifies a corresponding virtual connection and a first end and a second end associated with the corresponding virtual connection.

18. The method of claim 1 in which the first device or the second device comprise computer equipment, a relay, a switch, a sensor, a circuit breaker, a light emitting diode, a gauge, or a remote control.

19. A system comprising:
a computer-implemented user interface device to enable a user to specify or change information that is stored at a virtual connection server and that specifies a virtual connection and a first end and a second end associated with the virtual connection,
the virtual connection being effected by making available at the second end an updated state of a first device that is associated with the first end and is received at the virtual connection server,
the updated state at the second end being made available from the virtual connection server for use in controlling a second device associated with the second end.

20. The system of claim 19 in which the user interface enables the user to specify or change information that is stored at a virtual connection server and that specifies virtual connections to effect updating states at second ends of the virtual connections based on updated states of an arbitrary number of such first devices for use in controlling one or more of an arbitrary number of such second devices.

21. The system of claim 19 in which the user interface device enables the user to specify or change information that specifies each of a set of virtual connections.

22. The system of claim 19 in which the user interface device enables the user to define and manage information about the updated state of the first device.

23. A non-transitory computer-readable medium comprising instructions to:
through a user interface, enabling a user to specify or change information that is stored at a virtual connection server and that specifies a virtual connection and a first end and a second end associated with the virtual connection,
the virtual connection being effected by making available at the second end an updated state of a first device that is associated with the first end and is received at the virtual connection server,
the updated state at the second end being made available from the virtual connection server for use in controlling a second device associated with the second end.

24. The medium of claim 23 in which the updated state of the first device is changing no faster than at a predetermined rate.

25. The medium of claim 24 in which the predetermined rate comprises once a second.

26. The medium of claim 23 in which the updated state of the first device comprises a value.

27. The medium of claim 23 in which the updated state of the first device is associated with an action.

28. The medium of claim 27 in which the action comprises a switching of a state of the first device.

29. The medium of claim 28 in which the action comprises a switching of the state between an on state and an off state.

30. The medium of claim 23 in which the updated state of the first device comprises a level within a range.

* * * * *